United States Patent [19]
Wolfbauer, III

[11] Patent Number: 5,099,161
[45] Date of Patent: Mar. 24, 1992

[54] COMPACT ELECTRIC LINEAR ACTUATOR WITH TUBULAR ROTOR

[75] Inventor: Michael H. Wolfbauer, III, Roseville, Mich.

[73] Assignee: Savair Inc., St. Clair Shores, Mich.

[21] Appl. No.: 598,533

[22] Filed: Oct. 16, 1990

[51] Int. Cl.$^5$ .............................................. H02K 7/06
[52] U.S. Cl. ................................. 310/80; 74/424.8 R
[58] Field of Search ................... 310/80, 83, 254, 74, 310/84.14, 84.15, 424.8 R

[56] References Cited

U.S. PATENT DOCUMENTS

| | | | |
|---|---|---|---|
| 3,660,704 | 5/1972 | Paine et al. | 310/80 |
| 4,521,707 | 6/1985 | Baker | 310/80 |
| 4,560,894 | 12/1985 | Stoll | 310/80 |
| 4,614,128 | 9/1986 | Fickler | 74/424.8 R |
| 4,679,451 | 7/1987 | Nakamura | 74/424.8 R |

FOREIGN PATENT DOCUMENTS

| | | | |
|---|---|---|---|
| 2449560 | 5/1975 | Fed. Rep. of Germany | 310/80 |
| 2650953 | 5/1977 | Fed. Rep. of Germany | 310/83 |

OTHER PUBLICATIONS

AC SERVOMOTORS hollow shaft, GE Fanuc Automation, GmbH, appeared in IEN Magazine in England before Oct. 1990.

Primary Examiner—R. Skudy
Assistant Examiner—D. L. Rebsch
Attorney, Agent, or Firm—Remy J. VanOphem

[57] ABSTRACT

A compact electrically driven linear actuator having an electric motor in a housing. The electric motor has a cylindrically-shaped rotor assembly which is attached to and circumscribes a threaded spindle. A portion of the threaded spindle is received in an axial bore of a non-rotatable extendable arm. A nut attached to one end of the non-rotatable extendable arm is threadably received on the threaded spindle. Rotation of the threaded spindle by the electric motor linearly displaces the nut and the non-rotatable extendable arm along the length of the threaded spindle. In the preferred embodiment, the threaded spindle has a helical ball groove and the nut is a mating ball nut.

19 Claims, 2 Drawing Sheets

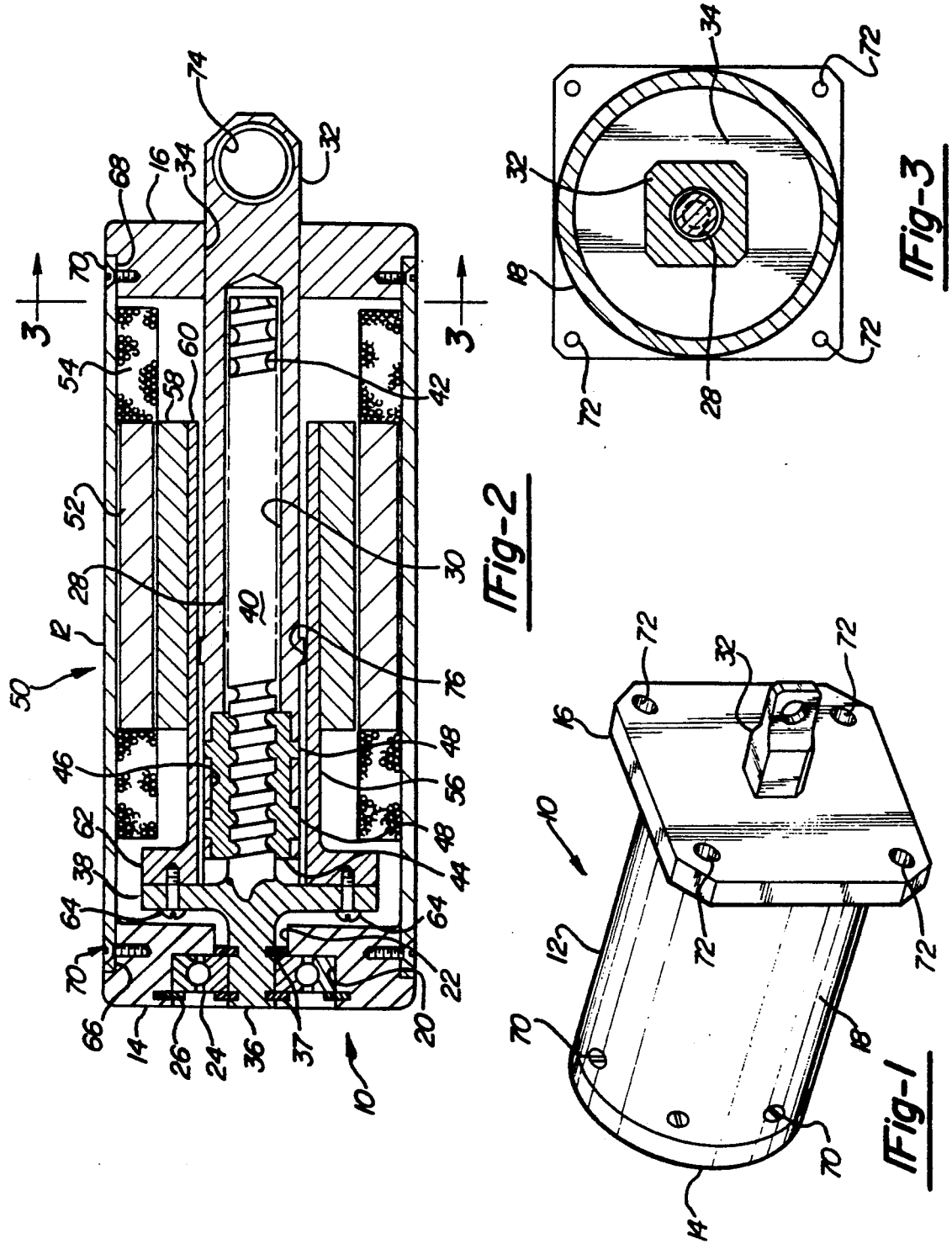

COMPACT ELECTRIC LINEAR ACTUATOR WITH TUBULAR ROTOR

BACKGROUND OF THE INVENTION

1. Field of the Invention

The invention is related to the field of linear actuators and in particular to compact electrically driven linear actuators for positioning welding guns or other tools on automated assembly lines.

2. Description of the Prior Art

Electrically driven linear actuators are well known in the art and are used in a variety of applications, such as positioning welding guns or other tools on automated assembly lines, or controlling the position of flaps on aircraft and various other applications. The electrically driven linear actuator conventionally converts the rotary motion of an electric motor to a linear motion using a nut and threaded rod. Henschke in U.S. Pat. No. 3,402,308 and Mabie et al in U.S. Pat. No. 4,579,012 teach linear actuators in which a threaded rod is linearly displaced by the rotation of a nut by an electric motor. In both of these linear actuators, the rotation of the threaded arm is inhibited by the object to which it is attached. This same concept is also taught by Grimm in U.S. Pat. No. 4,603,594 and Carlson et al in U.S. Pat. No. 4,773,497. Paine et al in U.S. Pat. No. 3,660,704 discloses a linear actuator in which an extendable arm is prevented from rotating. A portion of the extendable arm, axially displaced from the threaded portion, has a rectangular cross section which passes through a mating rectangular aperture attached to its housing.

In the alternative, Derby in U.S. Pat. No. 4,919,586 and Schwob in German Patent 3743341 A1 disclose linear actuators in which a threaded shaft is rotated by an electric motor and a nut is linearly translated along the threaded shaft. In the linear actuator taught by Derby, the nut is directly attached to a fixture plate which is guided parallel to the threaded shaft by a pair of parallel guide bars. In the linear actuator taught by Schwob, the threaded rod is disposed inside of an extendable arm and is rotated by a drive belt connected to the output of a bi-directional electrical motor. The ball nut is attached to the internal end of the extendable arm and is linearly displaced by the rotation of the threaded shaft.

SUMMARY OF THE INVENTION

The invention is a compact electrically driven linear actuator having a housing and an electric motor disposed in the housing. The housing has a pair of opposing end plates at its opposite ends. One of the opposing end plates has an axially disposed aperture through which a non-rotatable extendable arm is slidably disposed. The non-rotatable extendable arm has an axial bore extending form its end internal to the housing towards the end external to the housing. A threaded nut is attached adjacent to the internal end of the non-rotatable extendable arm. The threaded nut has a helical thread concentric with the axial bore. A threaded spindle is axially disposed in the housing. The threaded spindle extends into the axial bore of the extendable arm. The threaded spindle has a helical thread engaged by the internal thread of a threaded nut. The bi-directional electric motor has a cylindrically-shaped rotor assembly circumscribing the spindle. One end of the cylindrically-shaped rotor assembly is attached to the end of the spindle external to the axial bore and rotates the threaded spindle therewith. The rotation of the threaded spindle linearly displaces the threaded nut and the non-rotatable extendable arm relative to the housing.

In the preferred embodiment, the threaded spindle has a helical ball groove and the threaded nut is a ball nut having internal ball threads mating with the helical ball groove.

The object of the invention is a compact electrically driven linear actuator in which a non-rotatable extendable arm has an axial bore receiving a threaded spindle rotated by an electric motor.

Another object of the invention is a compact linear actuator in which the electric motor has a cylindrically-shaped rotor which circumscribes the spindle.

Another object of the invention is a compact linear actuator in which the extendable arm is non-rotatable relative to the housing.

Another object of the invention is to provide that the extendable arm and the aperture in the end plate through which the extendable arm passes have mating, generally rectangularly-shaped cross sections.

These and other objects of the invention will become more apparent from a detailed reading of the specification in conjunction with the drawings.

BRIEF DESCRIPTION OF THE DRAWINGS

FIG. 1 is a perspective of the preferred embodiment of the linear actuator;

FIG. 2 is a cross-sectional side view of the linear actuator shown in FIG. 1;

FIG. 3 is a cross section of the linear actuator taken along lines 3—3 of FIG. 2;

DETAILED DESCRIPTION OF THE PREFERRED EMBODIMENT

Figure 7:
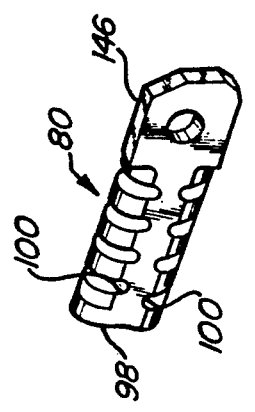
FIG. 7 is a perspective of a portion of the extendable arm.

The preferred embodiment of an electrically driven linear actuator 10 is shown in FIGS. 1 through 3. The linear actuator 10 has a housing 12 consisting of end plates 14 and 16 and a cylindrical housing sleeve 18 disposed between the two end plates. The end plate 14 has a recessed bearing seat 20 and a concentric clearance aperture 22 as shown in FIG. 2. A ball bearing 24 is secured in the recessed bearing seat 20 by a lock ring 26 or similar retainer received in an annular groove provided in the wall of the recessed bearing seat 20.

One end of a threaded spindle, such as a ball screw spindle 28, is rotatably supported by the ball bearing 24 while the other end extends into an axial bore 30 provided in an extendable arm 32. As shown the axial bore 30 extends a substantial portion of the total length of the extendable arm 32 from the internal end towards the external end. The extendable arm 32 has a generally rectangular cross section as shown in FIGS. 1 and 3 and is slidably but non-rotatably supported in a mating generally rectangular aperture 34 provided through the end plate 16.

The ball screw spindle 28 has a support shaft portion 36 received in the ball bearing 24, a flange portion 38 and a ball screw portion 40 which extends into the axial bore 30 of the extendable arm 32. The support shaft portion 36 is secured against axial displacement by a pair of lock rings 37 disposed in annular grooves provided in the support shaft portion 36 on either side of the ball bearing 24. The ball screw portion 40 of the ball screw spindle 28 has a helical ball groove 42 along its longitudinal extent which is threadably received through a threaded nut such as a ball nut 44 attached to the internal end of the extendable arm 32. The ball nut 44 is mounted in a counterbore 46 provided adjacent to the internal end of the extendable arm 32 and is locked therein by opposing sets of lugs 48 received in mating slots provided through the walls of the counterbore section of the extendable arm 32.

A bi-directional electric motor 50 is disposed in the housing 12 and circumscribes the ball screw spindle 28. The bi-directional motor 50 has a fixed stator 52 electrically energized by stator windings 54 and a cylindrically-shaped rotor assembly or armgoide 56 consisting of a permanent magnet assembly 58 attached to a rotor sleeve 60. The permanent magnet assembly 58 may be bonded to the rotor sleeve 60 or attached by means of threaded fasteners, such as 64, as is known in the art. A radial flange 62 provided at the end of the rotor sleeve 60 is attached to the flange portion 38 of the ball screw spindle 28 so that the rotor assembly 56 and the ball screw spindle 28 rotate as a unit.

The end plates 14 and 16 have annular recesses 66 and 68, respectively, which receive the ends of the cylindrical housing sleeve 18. The sleeve 18 may be secured to the end plates by a plurality of threaded fasteners 70 as shown. Preferably the end plate 16 has a generally rectangular shape as shown in FIGS. 1 and 3. Mounting holes 72 are provided through the end plate 16 which permit the linear actuator 10 to be attached to a support structure such as in known in the art. A mounting eye 74 may also be provided at the end of the extendable arm 32 to facilitate the mounting of a welding gun or other tools to the end of the extendable arm 32.

In operation, application of electrical power to the electric motor 50 causes the cylindrically-shaped rotor assembly 56 and the ball screw spindle 28 to rotate in a first direction. The ball nut 44 riding in the helical ball groove 42 of the ball screw spindle 28 and the extendable arm 32 will be displaced along the ball screw portion 40 of the ball screw spindle 28 away from the flange portion 38 producing an extension of the extendable arm 32 out from the housing 12 until it reaches the desired position. A stop 76 provided on the external surface of the extendable arm 32 engages the inner surface of the end plate 16 and limits the extension of the extendable arm 32. The stop 76 also prevents the disengagement of the ball nut 44 from the ball screw spindle 28.

The extendable arm 32 is retracted by actuating the electric motor 50 to operate in the reverse direction. The ball screw spindle 28 will now rotate in the opposite direction and the ball nut 44 and extendable arm 32 will be retracted into the housing 12.

In the preferred embodiment, the threaded spindle has the helical ball groove and the threaded nut has a mating ball thread. However, other types of helical grooves and threads may be used in place of the ball groove/ball nut combinations described above.

Figure 4:
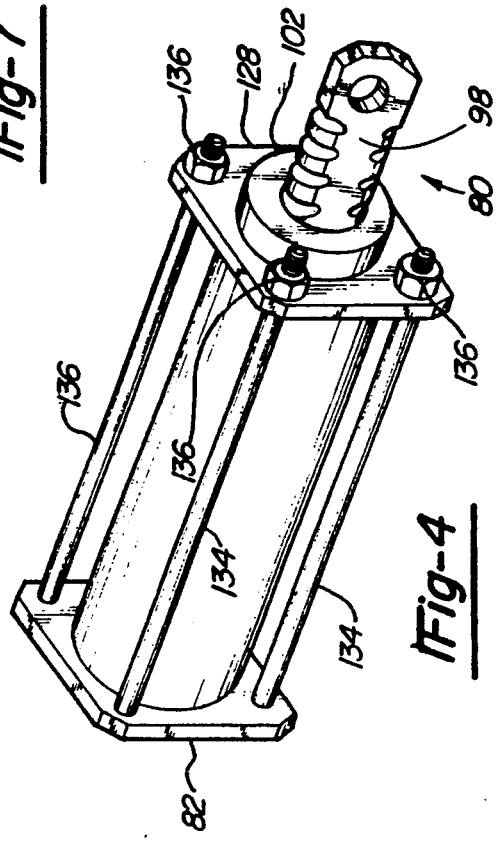
FIG. 4 is a perspective of an alternate embodiment of the linear actuator.
Figure 5:
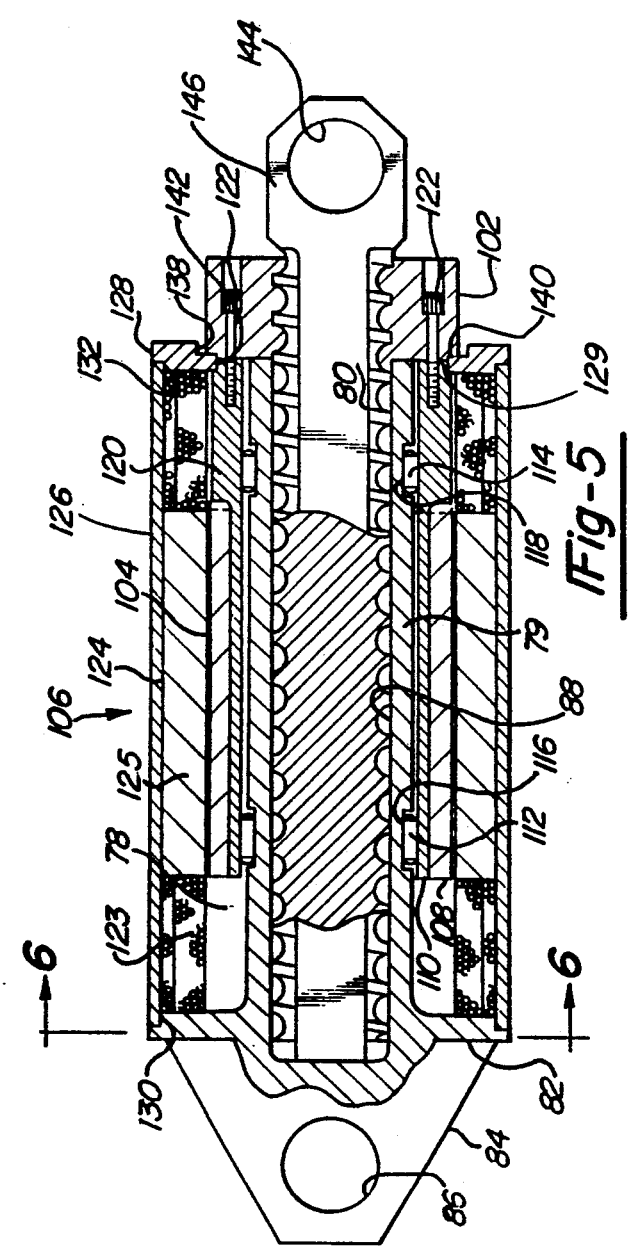
FIG. 5 is a cross-sectional side view of the linear actuator shown in FIG. 4.
Figure 6:
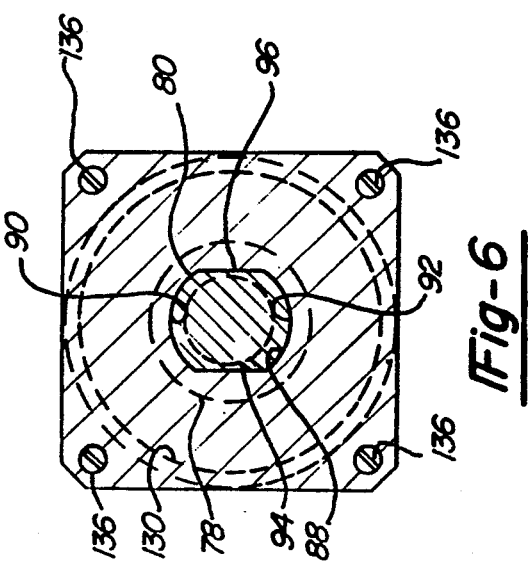
FIG. 6 is a cross section of the linear actuator taken along lines 6—6 of FIG. 5.

An alternate embodiment of the compact electrical driven linear actuator is shown in FIGS. 4 through 7. The alternate embodiment of the linear actuator has an axially disposed arm guide 78 having an actuator sleeve portion 79 which slidably supports a non-rotatable extendable arm 80. The arm guide 78 further has a radial flange 82 and a mounting tongue 84. The mounting tongue 84 may have a mounting eye 86 to facilitate mounting of the linear actuator to a support structure (not shown). The arm guide 78 has an internal guideway 88 which extends the length of the actuator sleeve portion 79. The cross section of the internal guideway 88, as shown in FIG. 6, has arcuate top and bottom portions 90 and 92, respectively, and flat or non-circular side walls 94 and 96. The arcuate top and bottom portions 90 and 92 are opposite sections of a circle.

The non-rotatable extendable arm 80 is slidably received in the internal guideway 88 and has a cross section which generally corresponds to the cross section of the guidway 88 as best shown in FIG. 6. As more clearly shown in FIG. 7, the extendable arm 80 has parallel side surfaces such as side surfaces 98 and adjacent segments of a helical ball screw groove 100 provided along its top and bottom surfaces. The mating flat side surfaces of the internal guideway 88 and the extendable arm 80 inhibit the rotation of the extendable arm 80 in the internal guideway 88.

A ball nut 102 attached to a cylindrically-shaped rotor assembly 104 of a bi-directional electric motor 106 engages the adjacent segments of the helical ball screw groove 100 provided on the upper and lower surfaces of the extendable arm 80. The cylindrically-shaped rotor assembly 104 of the reversible electric motor 106 consists of a magnet assembly 108 which is attached to a rotor cylinder 110 circumscribing the actuator sleeve portion 79. The rotor cylinder 110 is rotatably supported about the actuator sleeve portion 79, for example, by two sets of needle bearings 112 and 114 which are partially retained in recessed annular bearings seats 116 and 118 provided in the external surface of the actuator sleeve portion 79 of the arm guide 78 at two axially separated locations, as shown in FIG. 5. The ball nut 102 is attached to a radial flange 120 provided at the end of the rotor cylinder 110 by a plurality of recessed threaded fasteners 122 such as cap screws. The bi-directional electric motor 106 also has a stator assembly 124 circumscribing the rotor assembly 104. The stator assembly 124 is energized by electrical windings 123 wound around a core 125. The stator assembly 124 is fixedly attached to a cylindrical housing member 126 which extends substantially the length of the actuator sleeve portion 79 and encloses the bi-directional electric motor 106 and the arm guide 78.

One end of the cylindrical housing member 126 is attached to the radial flange 82 and the other end is attached to a rectangular end plate 128. Annular grooves 130 and 132 are provided in both the radial flange 82 and the rectangular end plate 128, respectively, which receive the ends of the cylindrical housing member 126. A plurality of threaded rods 134 secure the cylindrical housing member 126 between the radial flange 82 and the rectangular end plate 128. The threaded rods 134 are received through apertures 136 provided in the radial flange 82, as shown in FIGS. 4 and 6, and corresponding apertures provided through the rectangular end plate 128 and are locked thereon by nuts as shown in FIG. 4.

The end plate 128 has a clearance aperture 138 which circumscribes the ball nut 102 and an internal annular lip 140 which is received in an annular retainer slot 142 provided in the end of the radial flange 120. The annular lip 140 is captivated in the annular retainer slot 142 between the radial flange 120 of the rotor cylinder 110 and the ball nut 102. This prevents axial displacement of the rotor assembly 104 and the ball nut 102 relative to the arm guide 78 while providing bearing support for the rotating ball nut and rotor assembly.

The extendable arm 80 may have an attachment head 146 having a mounting eye 144 provided at its external end to facilitate the attachment of a welding gun or other tools to the end of the extendable arm 80.

In operation, providing electrical power to the bi-directional electric motor 106 will cause the rotor assembly 104 and the ball nut 102 to rotate. The rotation of the ball nut 102 in a first direction will linearly extend the extendable arm 80 while the rotation of the ball nut 102 in the opposite direction by the bi-directional electric motor 106 will retract the extendable arm 80.

It is not intended that the invention be limited to the specific structure shown in the drawings and described in the specification. It is recognized that those skilled in the art may modify these structures or make certain improvements thereto within the scope of the invention as described in the specification and set forth in the appended claims.

What is claimed is:

1. A compact linear actuator comprising:
   a housing having two opposing end plates, one of said two opposing end plates having an axially disposed aperture provided therethrough;
   a non-rotatable extendable arm slidably extending into said housing through said aperture, said non-rotatable extendable arm having an internal end disposed within said housing, an external end, and a non-threaded axial bore extending from said internal end towards said external end, said non-threaded axial bore extending along a substantial portion of the length of said non-rotatable extendable arm;
   a threaded nut attached to said internal end of said non-rotatable extendable, arm said threaded nut having a helical thread concentric with said non-threaded axial bore;
   an axially disposed threaded spindle rotatably supported within said housing and mounted to said helical thread of said threaded nut, said threaded spindle further extending into said non-threaded axial bore of said non-rotatable extendable arm; and
   a bi-directional electrical motor disposed in said housing, said bi-directional electrical motor having a rotor assembly circumscribing and directly connected to said non-rotatable extendable arm, one end of said rotor assembly being directly connected to said threaded spindle to rotate said threaded spindle therewith upon energization of said electrical motor, the rotation of said threaded spindle linearly displacing said threaded nut and said non-rotatable extendable arm relative to said housing.

2. The linear actuator of claim 1 wherein said non-rotatable extendable arm has a non-circular cross section and said aperture provided through said one end plate has a mating non-circular cross section which inhibits the rotation of said non-rotatable extendable arm relative to said housing.

3. The linear actuator of claim 1 wherein said non-rotatable extendable arm has a generally rectangular cross section and said aperture passing through said one end plate has a mating generally rectangular cross section which inhibits the rotation of said non-rotatable extendable arm relative to said housing.

4. The linear actuator of claim 1 wherein said rotor assembly comprises:
   a rotor sleeve circumscribing said extendable arm, one end of said rotor sleeve being connected to said threaded spindle; and
   a permanent magnet assembly attached to the external surface of said rotor sleeve.

5. The linear actuator of claim 4 wherein said threaded spindle has a radial flange disposed at one end thereof, and wherein said rotor sleeve has a mating radial flange attached to said radial flange disposed at said one end of said threaded spindle.

6. The linear actuator of claim 1 wherein said non-rotatable extendable arm has a counterbore provided adjacent to said internal end and wherein said threaded nut is disposed in said counterbore.

7. The linear actuator of claim 6 wherein said threaded nut further comprises at least a pair of diametrically disposed lugs radially protruding from its external surface, and wherein said non-rotatable extendable arm further comprises at least a mating pair of slots in said counterbore in which said diametrically disposed lugs of said threaded nut are received to lock said threaded nut to said non-rotatable extendable arm.

8. The linear actuator of claim 1 wherein said threaded spindle has a shaft portion external of said non-threaded axial bore, said shaft portion being rotatably supported by a ball bearing attached to the other of said two opposing end plates.

9. The linear actuator of claim 1 wherein said threaded nut is a ball nut and said threaded spindle is a ball screw spindle having a helical ball groove.

10. A linear actuator comprising:
    a housing having a central axis, said housing being enclosed by a pair of end plates attached to opposing ends thereof, one end plate of said pair of end plates having a non-circular aperture provided therethrough;
    a bi-directional motor disposed in said housing, said bi-directional motor having a stator assembly and a rotor assembly substantially concentric with said central axis of said housing;
    a ball screw spindle extending through said rotor assembly, said ball screw spindle having one end attached directly to said rotor assembly and rotatable therewith about said central axis;
    an extendable arm slidably mounted in said housing through said non-circular aperture of said one end plate, said extendable arm having a cross section corresponding to the shape of said non-circular aperture to prevent the rotation of said extendable arm relative to said one end plate, said extendable arm further having a non-threaded axial bore substantially concentric with said central axis, said non-threaded axial bore extending from an internal end of said extendable arm towards an external end, said ball screw spindle being axially and non-rotatably translatable in said non-threaded axial bore of said extendable arm; and
    a ball nut attached adjacent to said internal end of said extendable arm, said ball nut threadably received on said ball screw spindle and linearly displaceable along said ball screw spindle in response to the rotation of said ball screw spindle by said bi-directional motor.

11. The linear actuator of claim 10 wherein said non-circular aperture provided through said one end plate and said cross section of said extendable arm have mating complementary substantially rectangular shapes.

12. The linear actuator of claim 11 wherein said rotor assembly comprises:
   an annular sleeve circumscribing at least a portion of said extendable arm; and
   a permanent magnet assembly attached to an external surface of said annular sleeve in radial alignment with said stator assembly.

13. The linear actuator of claim 12 wherein said ball screw spindle has a radial flange disposed at one end thereof, said radial flange being attached to one end of said annular sleeve of said rotor assembly.

14. The linear actuator of claim 12 wherein said extendable arm has a counterbore provided in said internal end thereof, and wherein said ball nut is disposed in said counterbore.

15. The linear actuator of claim 12 wherein said ball screw spindle has a shaft portion external to said non-threaded axial bore, said shaft portion being rotatably supported in said housing by a ball bearing attached to the other end plate of said pair of end plates.

16. A linear actuator comprising:
   an arm guide having an actuator sleeve portion and a radial flange portion provided at one end of said actuator sleeve portion, said actuator sleeve portion having a longitudinally extending internal guideway passing therethrough, said longitudinally extending internal guideway having non-circular side walls;
   a bi-directional electric motor having a stator assembly and a cylindrically-shaped rotor assembly circumscribing said actuator sleeve portion of said arm guide;
   a housing member enclosing said bi-directional electric motor, said housing member having one end attached to said radial flange portion and an opposite end;
   an end plate attached to said opposite end of said housing member, said end plate having an axially disposed aperture provided therethrough generally aligned with said one end of said arm guide;
   an extendable arm slidably disposed in said longitudinally extending internal guideway of said arm guide, said extendable arm having non-circular sides mating with said non-circular side walls of said longitudinally extending internal guideway to prevent said extendable arm from rotating relative to said arm guide, said extendable arm further having segment portions of a helical ball groove provided thereon;
   a ball nut mounted on said segment portions of said helical ball groove at the end of said actuator sleeve portion opposite said radial flange portion, said ball nut being attached to said radial flange portion of said cylindrically-shaped rotor assembly through said axially disposed aperture provided in said end plate; and
   means for restraining the axial displacement of said cylindrically-shaped rotor assembly relative to said stator assembly and the axial displacement of said ball nut relative to the end of said actuator sleeve portion.

17. The linear actuator of claim 16 wherein said means for restraining comprises an inwardly extending annular lip provided on said end plate adjacent said axially disposed aperture and an annular recess provided at said one end of said cylindrically-shaped rotor assembly to receive said annular lip, said cylindrically-shaped rotor assembly being prohibited from an axial displacement in one direction by the engagement of said annular lip with a radial surface of said annular recess of said cylindrically-shaped rotor assembly and in an opposite direction by an end surface of said ball nut.

18. The linear actuator of claim 17 further comprising means for rotatably supporting said cylindrically-shaped rotor assembly about said actuator sleeve portion of said arm guide.

19. The linear actuator of claim 16 wherein said radial flange portion of said arm guide and said end plate have generally rectangular shapes and said housing member is received in annular grooves provided in the facing surfaces of said radial flange portion and said end plate, and further wherein said arm guide, said housing member, and said end plate are locked together by four threaded rod and mating nuts connecting said end plate to said radial flange portion at the four corners of said radial flange portion and said end plate.

* * * * *

UNITED STATES PATENT AND TRADEMARK OFFICE
CERTIFICATE OF CORRECTION

PATENT NO.  : 5,099,161
DATED       : March 24, 1992
INVENTOR(S) : Michael H. Wolfbauer, III It is certified that error appears in the above-identified patent and that said Letters Patent is hereby corrected as shown below:

Column 1, line 49, after "plates" insert ---- opposed ----.

Column 1, line 53, delete "form" and insert ---- from ----.

Column 3, line 20, delete "armgoide" and insert ---- arm guide ----.

Column 3, line 39, delete "32to" and insert ---- 32 to ----.

Column 4, line 17, delete "guidway" and insert ---- guideway ----.

Column 5, line 40, delete "extendable, arm" and insert ---- extendable arm, ----.

Column 7, line 3, delete "mat-".

Column 7, line 4, delete "ing".

Signed and Sealed this

Twenty-first Day of September, 1993

Attest:

BRUCE LEHMAN

*Attesting Officer*    Commissioner of Patents and Trademarks